Dec. 4, 1928.

M. D. WOODLING 1,694,197

VEHICLE WASHING TANK

Filed Oct. 10, 1923

INVENTOR
Miner D. Woodling
BY
ATTORNEY

Dec. 4, 1928.　　　　　　　　　　　　　　　　　1,694,197
M. D. WOODLING
VEHICLE WASHING TANK
Filed Oct. 10, 1923　　　　2 Sheets-Sheet 2
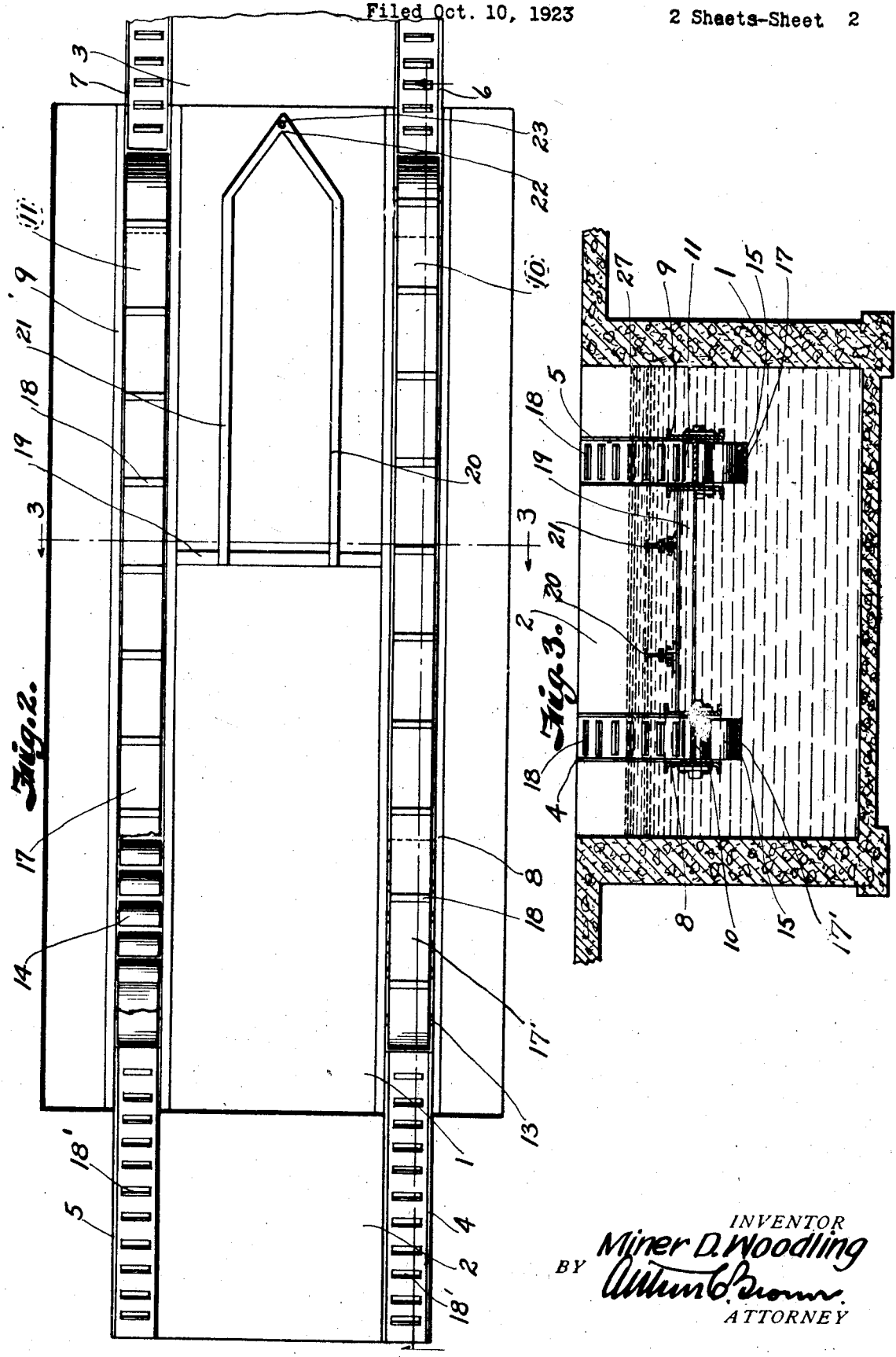
INVENTOR
Miner D. Woodling
BY
ATTORNEY Patented Dec. 4, 1928.

1,694,197

UNITED STATES PATENT OFFICE.

MINER D. WOODLING, OF KANSAS CITY, MISSOURI.

VEHICLE WASHING TANK.

Application filed October 10, 1923. Serial No. 667,636.

This invention relates to motor vehicle washing tanks and the primary object of the invention is to provide a tank into which a car may be driven, the car furnishing the power for agitating liquid in the tank to remove dust, dirt and other extraneous matter from the wheels and the lower portion of the body.

According to my invention the tank is built so that it may contain a cleaning liquid such as clear water, suds, oil and water or any other suitable liquid which will remove adhering particles from the wheels and body, the rotation of the drive wheels causing the liquid within the tank to agitate so that its movement against the car parts will loosen the adhering particles and means is provided whereby the motion of the drive wheels, for example, the rear wheels, may be communicated to the front wheels.

This method of cleaning the car will cause the particles to be removed from the car parts without liability of scratching, which occurs where chamois cloths, sponges and the like are rubbed over the parts to be cleaned. It also enables the car to be cleaned in an inexpensive and efficient manner.

While the car is being operated in the tank to agitate the water, another operator can spray off the top and sides above the water level in the tank; the operation of cleaning the top being simultaneous with the operation of cleaning the bottom. Therefore, the car can be cleaned in a very short time and all objectionable matter can be thoroughly removed.

The novel construction of one form of tank will be clearly understood by reference to the following description in connection with the accompanying drawings, in which—

Fig. 2 is a top plan view of a tank constructed in accordance with my invention, and Fig. 3 is a cross sectional view on the line 3—3 of Fig. 2.

Figure 1:
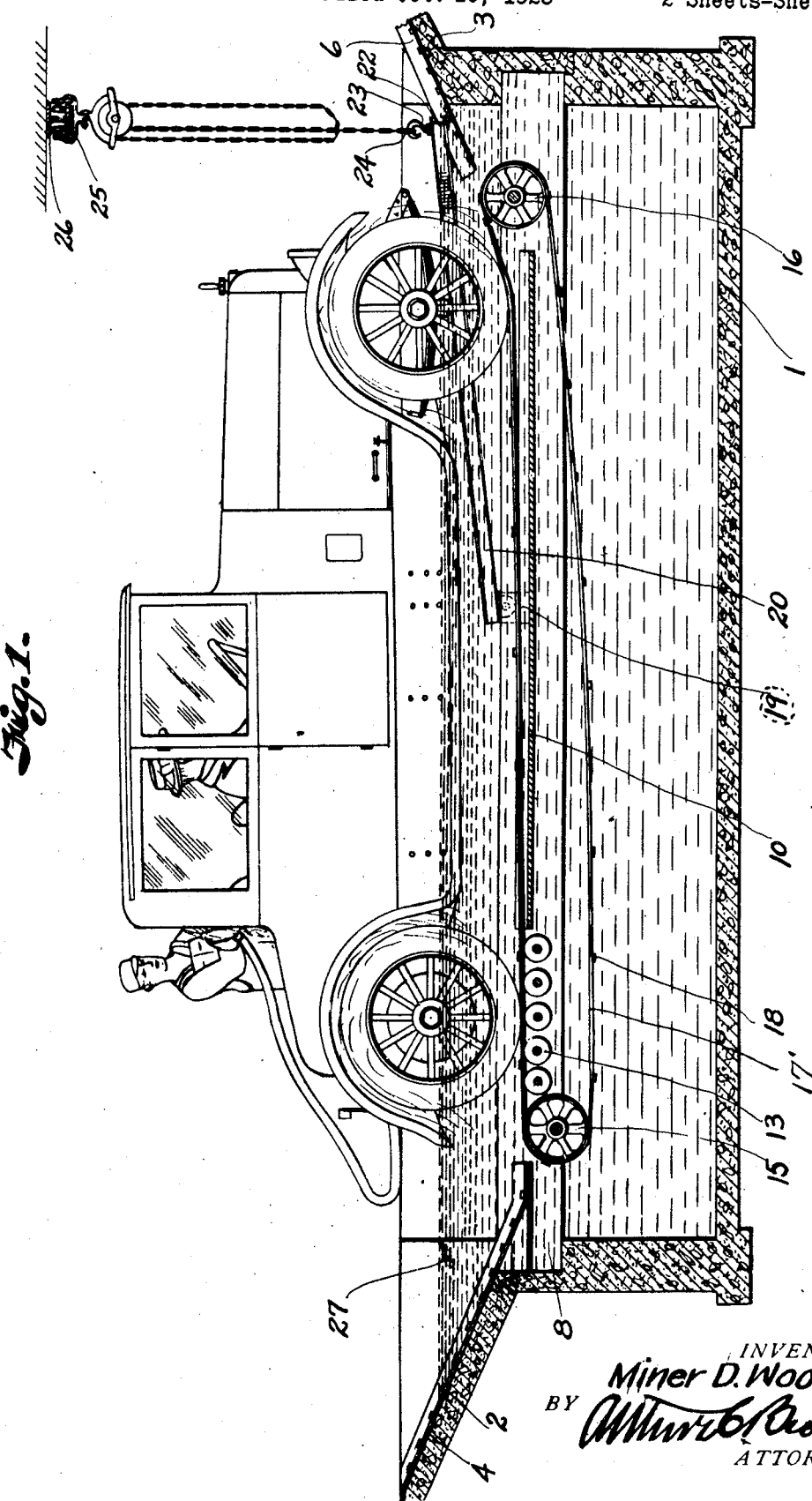
Fig. 1 is a vertical, longitudinal, sectional view on the line 1—1 of Fig. 2, showing a car in place.

The tank 1 is shown as substantially rectangular and it may consist of any material but for convenience I prefer to build it as a pit of concrete or similar material, the top of the tank being preferably level with the floor of the garage or building in which it is located.

The opposite ends of the tank are provided with runways 2 and 3, which support tracks for the wheels of the vehicle. The runway 2 supports channel-shaped tracks 4 and 5, and similar tracks 6 and 7 are supported by the runway 3.

In line with the tracks and longitudinally of the tank are channel members 8 and 9, the flanges of which are of sufficient heights to guide the wheels of the vehicles through the tank so that there can be no sidewise movement of the vehicle to cause it to drop into the bottom of the tank. It is understood that the channels 8 and 9 are supported above the bottom of the tank and preferably upon shoulders or abutments at the ends of the tank.

Fastened to the flat side flanges of the channels 8 and 9 are supporting plates 10 and 11. These extend only part way throughout the length of the channels and at the rear ends of the plates 10 and 11 are sets of rollers 13 and 14, which may be journaled in the flanges of the channels 8 and 9, as will be clearly seen by reference to Figs. 1 and 2.

Idler pulleys 15 and 16 are journaled in the channels 8 and 9 and around these pulleys pass endless belts 17 and 17', the upper runs of the belts traveling over the plates 10 and 11. The belts will be substantially in line with the tracks 4, 5, 6 and 7 and the belts are preferably provided with cleats 18 and the runways 4, 5, 6 and 7 are provided with similar cleats 18'.

Transversely of the tank and supported by the channels 8 and 9 is a bar 19, upon which is pivoted a front axle-supporting frame consisting of the side bars 20 and 21 connected together at 22 at their front ends. The front ends of the frame at 22 is provided with a hook 23 to engage a link in the chain 24 of a block and chain hoist which has a hanger 25, movably supported on an I-beam 26 suspended from a support or ceiling so that the block and chain can be moved out of the way of the car when the car is moving into or out of the tank.

A cleaning liquid 27 can be supplied in the tank, the level of which is above the channels and preferably maintained so that it will reach the axles of the car when the car is driven into the tank. Then when the liquid is agitated, it will be splashed against the wheels and against the lower portion of the car so as to soften and remove adhering particles.

Assuming the parts to be assembled with the requisite amount of cleaning fluid or liquid in the tank, the driver either drives into or backs into the tank so that the wheels pass over the belts. The rear wheels will rest upon those portions of the belts which are supported by the rollers 13 and 14, and the front wheels will be supported upon the belts resting upon the plates 10 and 11. Then the operator connects the chain 24 to the hook 23 and by raising the frame consisting of the side bars 20 and 21, the front axle of the car is slightly raised so that the belts will not rest upon the plates 10 and 11. The belts will be in intimate contact with the peripheries of the front wheels, however, so that when the belts move, the front wheels will move.

The operator then operates his car just as if he were driving. The rotation of the rear wheels will impart a rotative movement to the belt. The rear wheels, being partly submerged below the surface of the liquid, will cause a violent agitation to throw the liquid against the bottom of the car. The belts will impart rotative movements to the front wheels which will cause violent agitation of the liquid to throw it against the bottom of the car at the front. The car need be operated either in reverse or forward only for a very short time before the rough or heavy particles are removed.

If the owner wishes a more refined cleaning operation he can either back or drive his motor vehicle out and propel the car into another tank in which suds are provided, or he may drive into a tank of similar construction in which water and kerosene is the cleaning liquid. If water and kerosene are provided, the kerosene will rise to the top and be splashed against the vehicle so that the heavy oils, tar, etc., will be cut from the surface of the vehicle; this treatment being especially desirable for dissolving or cutting out the heavy particles which are thrown up by the wheels and which adhere to the bottom of a car in driving over roadways.

Finally the car can be run through a rinsing tank and then wiped off when the finish will be perfectly clean.

Of course, during the time that the car is stationary in one of the tanks, the top will be sprayed off and the windows cleaned so that there is no loss of time in the cleaning operation.

In actual practice the car can pass through a tank or a series of tanks in a comparatively short time. The driver can drive into the garage, into the tank, operate his car, drive out of the tank and in a very few minutes have the rough material removed from his car. Of course, if he wishes a refined job, it will take a little longer because his car will have to pass through additional tanks but even then the cleaning operation will be comparatively short and the car will be ready to be driven on without any unnecessary delays.

Of course, it is to be understood that when the driver is to drive his car out of the tank, the frame holding the front axle can be lowered until the front wheels rest upon the belts with the belts flat on their plates 10 and 11. Then the rear wheels will not be able to drive the belts on account of the friction of the belts against their plates. Traction will then be afforded so that the car can be moved out of the tank.

When the chain is released from the hook 23, the chain and tackle can be moved out of the way of the car by sliding the hanger on the bracket or support 26.

From the foregoing it will be apparent that the device is simple in construction, easy in operation and that the bottom of the car can be cleaned in an efficient manner by operating the car itself within the tank.

What I claim and desire to secure by Letters Patent is:

1. A car washing apparatus comprising a tank, means for guiding a motor vehicle into the tank, channeled rails forming a trackway supported by the tank above the bottom thereof with the channels facing upwardly, endless belts having their upper laps traveling in the channels in the rails, idlers at one end of the tank on which the upper laps of the belts rest, and a vehicle-lifting mechanism at the opposite end of the tank.

2. A car washing apparatus comprising a tank, means for supporting a motor vehicle in the tank, inclined channeled guides leading to said means, said supporting means including an endless belt for receiving the vehicle wheels, and rotatable means under the rear wheels for supporting the belt, said belt being adapted for communicating the rotative movement of the rear wheels to the front wheels.

In testimony whereof I affix my signature.

MINER D. WOODLING.